United States Patent
Koga

(10) Patent No.: US 10,093,238 B2
(45) Date of Patent: Oct. 9, 2018

(54) ACCESS SYSTEM AND WORK VEHICLE

(71) Applicant: KOMATSU LTD., Tokyo (JP)

(72) Inventor: Mitsuhiro Koga, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/316,580

(22) PCT Filed: Jun. 29, 2015

(86) PCT No.: PCT/JP2015/068664
§ 371 (c)(1),
(2) Date: Dec. 6, 2016

(87) PCT Pub. No.: WO2017/002160
PCT Pub. Date: Jan. 5, 2017

(65) Prior Publication Data
US 2017/0190293 A1    Jul. 6, 2017

(51) Int. Cl.
*B60R 3/02* (2006.01)
*B60R 3/00* (2006.01)
*E02F 9/08* (2006.01)

(52) U.S. Cl.
CPC ............... *B60R 3/005* (2013.01); *B60R 3/00* (2013.01); *E02F 9/0833* (2013.01)

(58) Field of Classification Search
CPC ........... B60R 3/00; B60R 3/005; B60R 3/007; B60R 3/02; E02F 9/0833
USPC .................................. 280/163, 166; 182/127
See application file for complete search history.

(56) References Cited

U.S. PATENT DOCUMENTS

| | | | |
|---|---|---|---|
| 6,068,277 A | 5/2000 | Magnussen | |
| 6,347,686 B1 * | 2/2002 | Hedley | B60R 3/02 182/127 |
| 8,397,869 B2 * | 3/2013 | Tsutsumi | E02F 9/0833 182/127 |
| 8,931,792 B1 * | 1/2015 | Klassen | B60R 3/02 182/65.1 |
| 9,238,941 B2 * | 1/2016 | Ellement | B60R 3/02 |
| 2012/0205195 A1 | 8/2012 | Tsutsumi et al. | |
| 2013/0092474 A1 * | 4/2013 | Magnussen | E06C 5/04 182/127 |
| 2014/0190776 A1 | 7/2014 | Kishinami | |

FOREIGN PATENT DOCUMENTS

| | | |
|---|---|---|
| AU | 2014250712 A1 | 6/2015 |
| JP | 2005-083033 A | 3/2005 |

(Continued)

*Primary Examiner* — John Daniel Walters
(74) *Attorney, Agent, or Firm* — Drinker Biddle & Reath LLP

(57) ABSTRACT

A climbing apparatus body is supported by a main frame rotatably about a rotational shaft at one end. The climbing apparatus body is capable of taking an in-use posture in which the climbing apparatus body is inclined so that the other end is located below the one end and a folded posture in which the climbing apparatus body stands so that the other end is directed upward. A handrail is supported by the main frame. A pair of right and left banisters is attached to the climbing apparatus body and includes a portion extending toward the handrail relative to the position (perpendicular line) of the rotational shaft in the direction from the other end to the one end in the in-use posture in a side view of the climbing apparatus body.

7 Claims, 7 Drawing Sheets

(56) References Cited

FOREIGN PATENT DOCUMENTS

| | | |
|---|---|---|
| JP | 2008-546576 A | 12/2008 |
| JP | 2010-133151 A | 6/2010 |
| JP | 4967080 B2 | 7/2012 |
| JP | 2014-114573 A | 6/2014 |
| WO | WO-2006/133513 A1 | 12/2006 |
| WO | WO-2012/035848 A1 | 3/2012 |
| WO | WO-2016/136535 A1 | 9/2016 |

* cited by examiner

ACCESS SYSTEM AND WORK VEHICLE

TECHNICAL FIELD

The present invention relates to an access system and a work vehicle including the access system.

BACKGROUND ART

In a large-sized work vehicle, an operator's compartment is disposed at a high position. For this reason, an access system is provided so that an operator can access the operator's compartment. The access system includes a foldable climbing apparatus, such as a ladder.

An access system for such a vehicle is disclosed in, for example, Japanese National Patent Publication No. 2008-546576 (PTD 1).

The access system described in the above document includes access stairs, banisters, and handrails. The banisters are attached to the access stairs. The handrails are attached to the body of a work vehicle.

The access stairs is rotatable between an in-use posture and a folded posture. The access stairs is inclined relative to a horizontal plane when in use, and stands when folded.

CITATION LIST

Patent Document

PTD 1: Japanese National Patent Publication No. 2008-546576

SUMMARY OF INVENTION

Technical Problem

In an in-use state of the access stairs, the banisters on the access stairs and the handrails on the body overlap each other in a side view of the access stairs. This safeguards an operator going up/down the access stairs.

When the access stairs in the in-use state is smaller in inclination angle relative to a horizontal plane, the banisters are lower in height in the vertical direction than when the access stairs is larger in inclination angle. In this case, the banisters are low in height as seen from an operator going up/down the access stairs and an operator cannot easily grasp the banisters. The banisters thus need to be made higher in height in the vertical direction in a state where the access stairs is small in inclination angle relative to a horizontal plane. The banisters higher in height require the handrails on the body to be extended to the banister side in order for the handrails to overlap the banisters in a side view in the in-use state.

This makes the handrails protrude outward in a folded state of the access stairs. Thus, there is an increased risk that portions of the handrails protruding outside the vehicle may interfere with obstacles while the vehicle is in action.

The present invention has been made in view of the above problems. An object of the present invention is to provide an access system and a work vehicle including the access system that can prevent interferences even when a climbing apparatus body in an in-use state has a shallow inclination angle relative to a horizontal plane.

Solution to Problem

An access system of the present invention includes a support member, a climbing apparatus body, a handrail, and a banister. The support member includes a main frame. The climbing apparatus body includes a first end and a second end and supported by the support member rotatably about a rotational shaft at the first end, the climbing apparatus body being capable of taking an in-use posture in which the climbing apparatus body is inclined so that the second end is located below the first end and a folded posture in which the climbing apparatus body stands so that the second end is directed upward. The handrail is supported by the support member. The banister is attached to the climbing apparatus body, the banister including a portion extending toward the handrail relative to the position of the rotational shaft in the direction from the second end to the first end in the in-use posture in a side view of the climbing apparatus body.

According to the access system of the present invention, the banister includes a portion extending toward the handrail relative to the position of the rotational shaft. This eliminates the need for extending the handrail outward (to the banister side) in order to overlap the banister and handrail with each other in the in-use posture, if the climbing apparatus body is made smaller in inclination angle relative to a horizontal plane and the banister needs to be higher in height. Since there is no need to extend the handrail outward, the outward protrusion of the handrail can be small in dimension in the folded posture of the climbing apparatus and interferences between the handrail and obstacles can be avoided.

In the above-described access system, the banister includes a pair of right and left banister portions. The width between the right and left banister portions of the pair is larger than the width of the main frame. This can prevent the pair of right and left banister portions from interfering with the support member in the folded posture.

In the above-described access system, in the in-use posture, the banister is connected to a side portion of the climbing apparatus body and extends from the side portion laterally and then upward. Accordingly, the width between the right and left banister portions of the pair can easily be made larger. Further, a shock-absorbing member can be attached to a position that is to face a connection plate of the climbing apparatus body in the folded posture. Accordingly, the shock-absorbing member can relax shocks due to impacts of a side plate and the connection plate on each other when the climbing apparatus body is rotated from the in-use posture to the folded posture.

In the above-described access system, in a side view of the climbing apparatus body, the banister overlaps the handrail in the in-use posture. Accordingly, an operator going up/down the climbing apparatus body can grasp the banister and the handrail continuously. This can ensure ease of ascent and descent for an operator going up/down the climbing apparatus body and can safeguard an operator.

In the above-described access system, the support member includes a connection plate. The connection plate is disposed between the handrail and the main frame, the connection plate having a front end located on the side adjacent to the rotational shaft and a rear end located on the side opposite to the front end. The height of the banister from the rotational shaft is less than the distance from the rotational shaft to the rear end of the connection plate. This can prevent the banister from interfering with other members when the climbing apparatus body rotates between the in-use posture and the folded posture.

In the above-described access system, the banister and the climbing apparatus body are connected to each other at least at a first connection portion and a second connection portion. In a side view of the climbing apparatus body in the folded posture, the first connection portion and the second connection portion are adjacent to each other with the handrail lying between the first connection portion and the second connection portion. The handrail includes a protruding area that protrudes, relative to the first connection portion and the second connection portion, in the direction of rotation of the climbing apparatus body from the folded posture. The protruding area is located within an area larger than the radius of rotation of the first connection portion and smaller than the radius of rotation of the second connection portion at a time of rotation of the climbing apparatus body. Thus, the first and second connection portions are disposed so that the rotational trajectories of the connection portions at which the banister and the climbing apparatus body are connected to each other will not interfere with the protruding area of the handrail within an angular range of rotation of the climbing apparatus body from the in-use posture to the folded posture in a side view of the climbing apparatus body. This can prevent the banister from interfering with the handrail within the angular range of rotation from the in-use posture to the folded posture.

A work vehicle of the present invention includes a body including the above-described access system. According to the work vehicle of the present invention, interferences between the handrail and obstacles can be prevented even when the climbing apparatus body in the in-use state is made smaller in inclination angle relative to a horizontal plane as described above.

In a case where the above-described access system is applied to a work vehicle, the support member may include any part of the body of the work vehicle.

Advantageous Effects of Invention

As described above, according to the present invention, interferences between the handrail and obstacles can be prevented even when the climbing apparatus body in the in-use state is made smaller in inclination angle relative to a horizontal plane.

DESCRIPTION OF EMBODIMENTS

An embodiment of the present invention is described below with reference to the drawings.

Initially, a structure of a work vehicle in an embodiment of the present invention is descried. A hydraulic excavator is described below with reference to FIG. 1 as an example of a work vehicle to which the idea of the present invention is applicable. The present invention is also applicable to a work vehicle including an access system other than a hydraulic excavator, such as a bulldozer and a wheel loader.

In this example, the positional relationship among components is described with respect to an operator seated on the operator's seat in an operator's compartment 31. The front-rear direction represents the front-rear direction with respect to an operator seated on the operator's seat. The right-left direction (width direction) represents the right-left direction with respect to an operator seated on the operator's seat. The up-down direction represents the up-down direction with respect to an operator seated on the operator's seat.

The direction in which an operator seated on the operator's seat faces forward is the front direction, and the direction opposite to the front direction is the rear direction. The right side and the left side in a state where an operator seated on the operator's seat faces forward are the right direction and the left direction, respectively. The foot side of an operator seated on the operator's seat is the lower side and the overhead side is the upper side.

Figure 1:
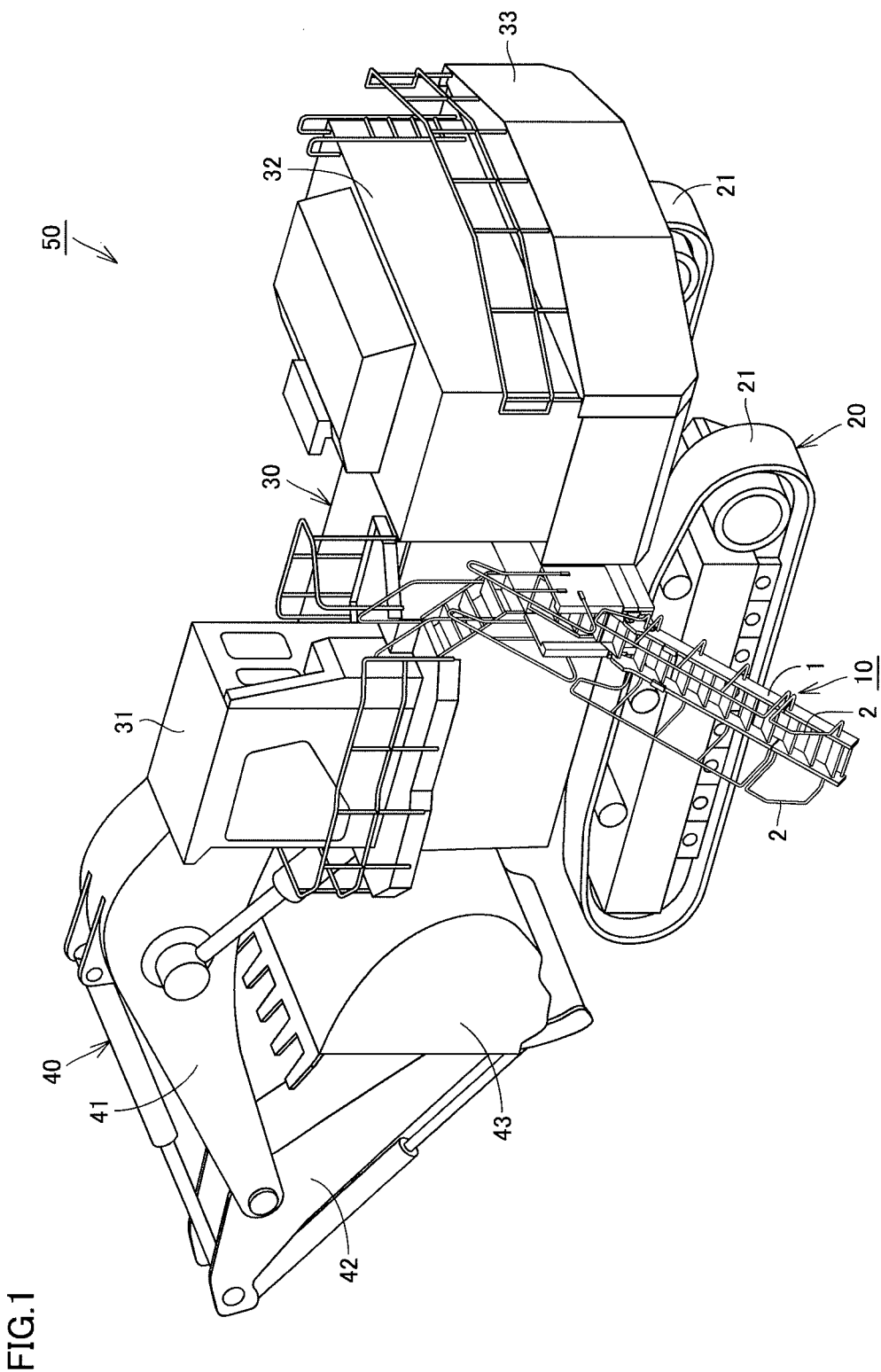
FIG. 1 is a perspective view schematically showing a structure of a hydraulic excavator in an embodiment of the present invention.

FIG. 1 is a perspective view schematically showing a structure of a hydraulic excavator in an embodiment of the present invention. As shown in FIG. 1, a hydraulic excavator 50 of the present embodiment is a large-sized hydraulic excavator and mainly includes a travelling unit 20, a revolving unit 30, and a work implement 40. Travelling unit 20 and revolving unit 30 constitute the body of the work vehicle.

Travelling unit 20 includes a pair of right and left crawler belt apparatuses 21. Paired right and left crawler belt apparatuses 21 include respective crawler belts. A rotary drive of paired right and left crawler belt apparatuses 21 allows hydraulic excavator 50 to be self-propelled.

Revolving unit 30 is installed to be revolvable relative to travelling unit 20. Revolving unit 30 mainly includes operator's compartment 31, an engine compartment 32, a counterweight 33, and an access system 10.

Operator's compartment 31 is disposed on the front left side (vehicle front side) of revolving unit 30. Engine compartment 32 and counterweight 33 are disposed on the rear side (vehicle rear side) of revolving unit 30. Engine compartment 32 houses an engine unit (such as an engine, a structure for an exhaust treatment). The upper portion of engine compartment 32 is covered with an engine hood. Counterweight 33 is disposed in the rear of engine compartment 32.

Access system 10 is disposed on a side portion, e.g. the left side, of revolving unit 30. Access system 10 is provided for an operator to get into operator's compartment 31 from the ground and to get off from operator's compartment 31 onto the ground. A detailed structure of access system 10 will be described later.

Work implement 40 is pivotally supported on the front side of revolving unit 30. Work implement 40 includes, for example, a boom 41, an arm 42, a bucket 43, and a hydraulic cylinder. The proximal end of boom 41 is rotatably joined to revolving unit 30. The proximal end of arm 42 is rotatably joined to the distal end of boom 41. Bucket 43 is rotatably joined to the distal end of arm 42. Boom 41, arm 42, and bucket 43 are driven by the hydraulic cylinder, thereby allowing work implement 40 to be driven.

Next, a structure of the access system in the present embodiment is described with reference to FIG. 2.

Figure 2:
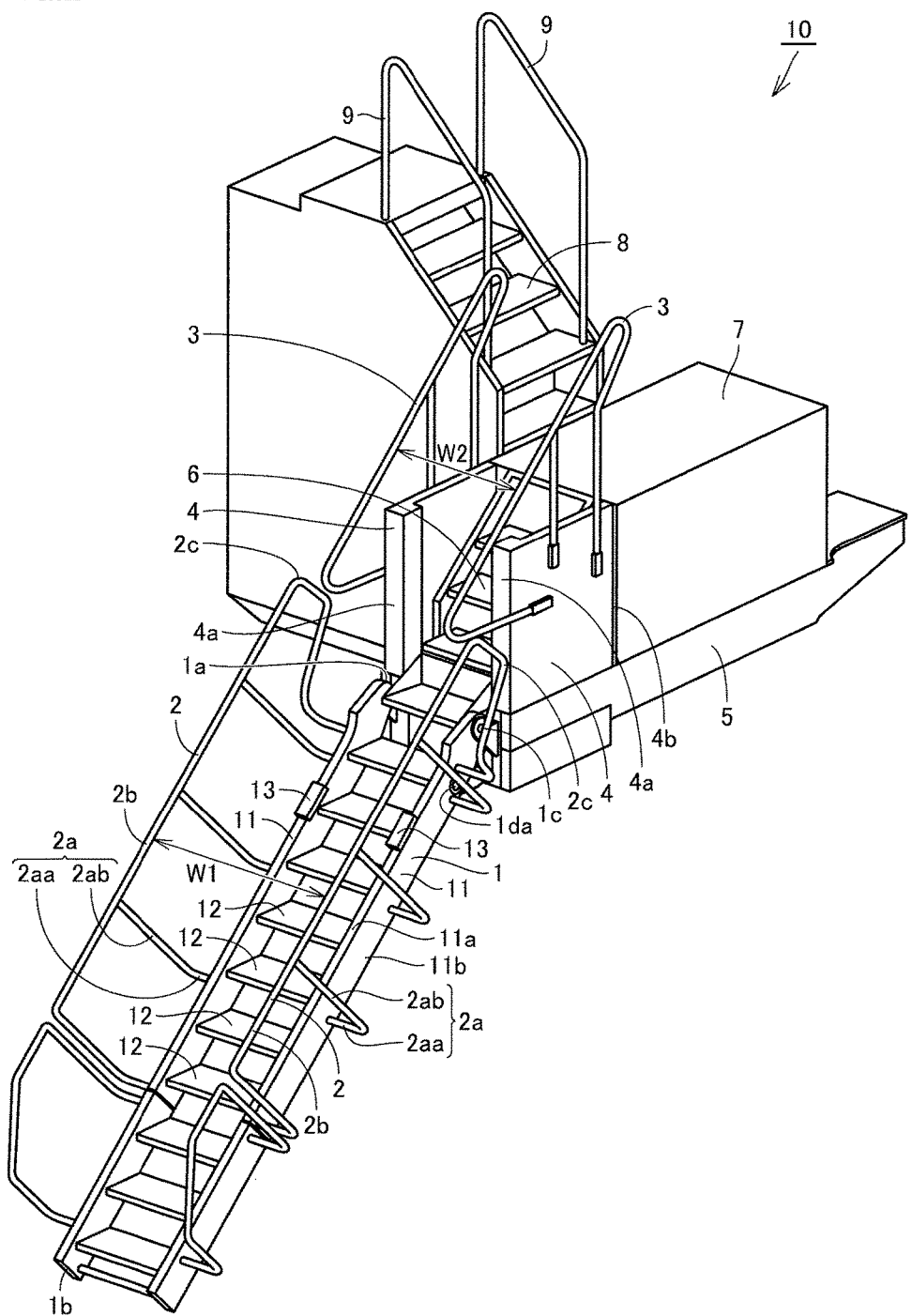
FIG. 2 is a perspective view schematically showing a structure of an access system included in the hydraulic excavator shown in FIG. 1.

FIG. 2 is a perspective view schematically showing a structure of the access system included in the hydraulic excavator shown in FIG. 1.

Figure 4:
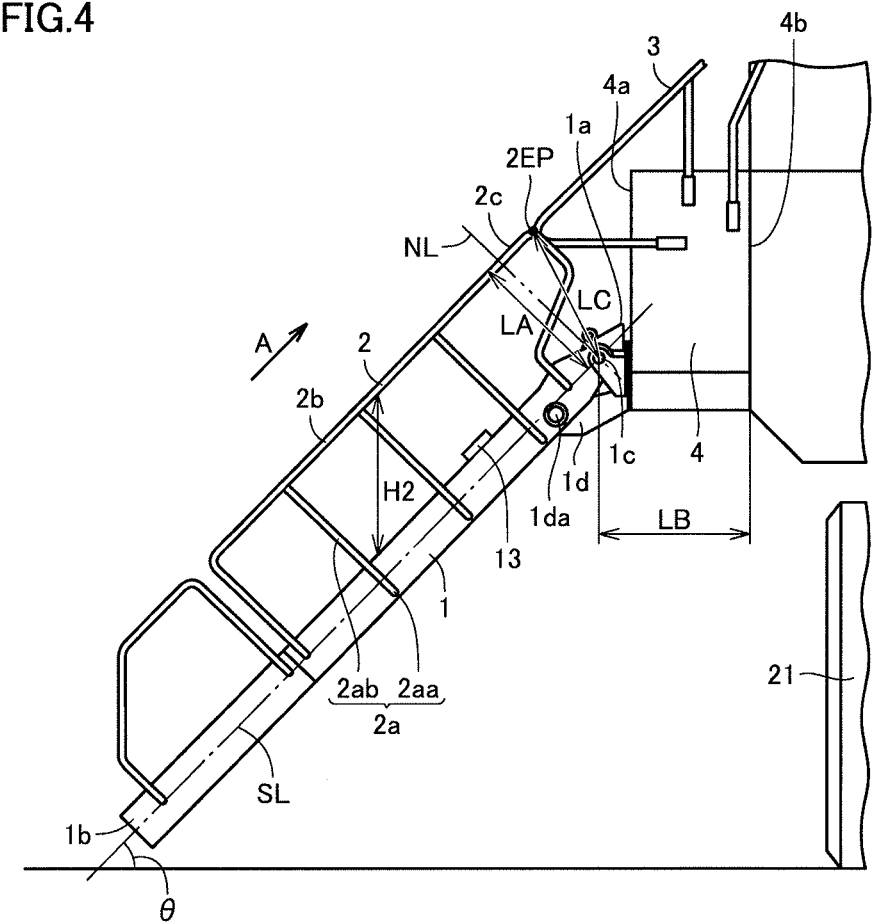
FIG. 4 shows a state where the climbing apparatus body in the hydraulic excavator shown in FIG. 1 is in an in-use posture, FIG. 4 being shown from a side of the climbing apparatus body (from the rear of the work vehicle).
Figure 5:
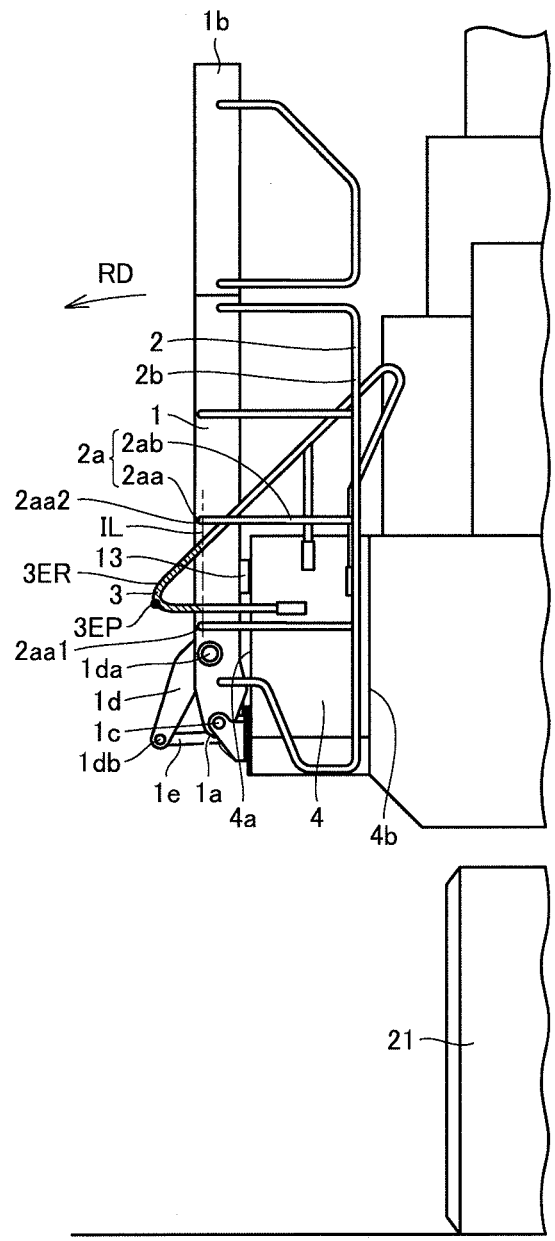
FIG. 5 shows a state where the climbing apparatus body in the hydraulic excavator shown in FIG. 1 is in a folded posture, FIG. 5 being shown from a side of the climbing apparatus body (from the rear of the work vehicle).

The lateral direction of climbing apparatus body 1 included in access system 10 corresponds to the above-described front-rear direction of work vehicle 50. In particular, FIGS. 4 and 5 show respective states of climbing apparatus body 1 seen from the rear to the front of work vehicle 50.

As shown in FIG. 2, access system 10 in the present embodiment mainly includes climbing apparatus body 1, a pair of right and left banister portions (banisters) 2, a pair of right and left handrails 3, a pair of right and left connection plates 4, a main frame 5, stair portions 6 and 8, a passage portion 7, and banisters 9.

Climbing apparatus body 1 mainly includes two side plates 11, a plurality of steps 12, and shock-absorbing members (stoppers) 13. Two side plates 11 are disposed with a space lying between them. A plurality of steps 12 are disposed between two side plates 11 and are connected to each of two side plates 11. Two side plates 11 and a plurality of steps 12 constitute a ladder. A plurality of steps 12 are portions that serve as footholds when an operator goes up/down climbing apparatus body 1.

Shock-absorbing members 13 are attached to two respective side plates 11. Shock-absorbing members 13 are stoppers and are portions that come in contact with connection plates 4 when climbing apparatus body 1 is switched from an in-use posture to a folded posture. Shock-absorbing members 13 are disposed on surfaces of side plates 11 which are to face front ends 4a of connection plates 4 in the folded posture of climbing apparatus body 1. Shock-absorbing members 13 are made of a material such as a rubber. Shock-absorbing members 13 may be provided on connection plates 4.

Paired right and left banister portions 2 are connected to the respective side portions of climbing apparatus body 1. In the in-use posture of climbing apparatus body 1, banister portions 2 are connected to the side portions of climbing apparatus body 1 and extend from the side portions in the directions (laterally) away from climbing apparatus body 1 and then in the height direction.

Specifically, paired right and left banister portions 2 each include a support portion 2a, a grasp portion 2b, and a protruding portion 2c. Support portions 2a each include a horizontal portion 2aa and a vertical portion tab. Horizontal portions 2aa are attached to each side plate 11. Each horizontal portion 2aa extends from a connection portion, at which horizontal portion 2aa is connected to side plate 11, to the side opposite to steps 12. Each vertical portion 2ab is connected to an end of horizontal portion 2aa, the end being on the side opposite to steps 12. In the in-use posture of climbing apparatus body 1, each vertical portion 2ab extends upward from a connection portion at which vertical portion 2ab is connected to horizontal portion 2aa.

Each grasp portion 2b is connected to the upper ends of vertical portions 2ab. Grasp portions 2b are portions of banister portions 2 which an operator grasps when going up/down climbing apparatus body 1. Grasp portions 2b extend in the direction from the other end (second end or distal end) 1b to one end (first end or proximal end) 1a of climbing apparatus body 1. Grasp portions 2b extend, for example, in parallel with side plates 11.

Protruding portions 2c protrude from ends of grasp portions 2b to the handrail 3 side in the in-use posture of climbing apparatus body 1. The upper portions of protruding portions 2c are linearly continuous with grasp portions 2b. Grasp portions 2b and the upper portions of protruding portions 2c are set to be the same in height from side plates 11.

Climbing apparatus body 1 has one end 1a and the other end 1b. Climbing apparatus body 1 is supported by main frame 5 rotatably about a rotational shaft 1c at one end 1a. Climbing apparatus body 1 is thus movable between the in-use posture and the folded posture.

The in-use posture of climbing apparatus body 1 refers to a posture in which climbing apparatus body 1 is inclined so that the other end 1b of climbing apparatus body 1 is located below one end 1a as shown in FIGS. 2 and 4. The folded posture refers to a posture in which climbing apparatus body 1 stands (upright) so that the other end 1b is directed upward as shown in FIG. 5.

Paired right and left connection plates 4 are each connected to main frame 5. Paired right and left connection plates 4 are each connected to main frame 5 with fastening members, such as bolts, for example. Paired right and left connection plates 4 are thus each fixed to main frame 5 as standing relative to main frame 5. Connection plates 4 and main frame 5 are included in a support member. Paired right and left connection plates 4 each have a front end 4a located on the side adjacent to the rotational shaft 1c and a rear end 4b located on the side opposite to front end 4a.

Paired right and left handrails 3 are attached to respective connection plates 4. Handrails 3 are thus supported by main frame 5 with connection plates 4 lying between handrails 3 and main frame 5. Paired right and left handrails 3 each protrude to the climbing apparatus body 1 side relative to front end 4a of connection plate 4. Paired right and left handrails 3 each protrude upward relative to the upper end of connection plate 4. Paired right and left handrails 3 include respective inclination portions. The inclination portions are inclined upward from the front end 4a side to the rear end 4b side of connection plates 4.

Figure 3:
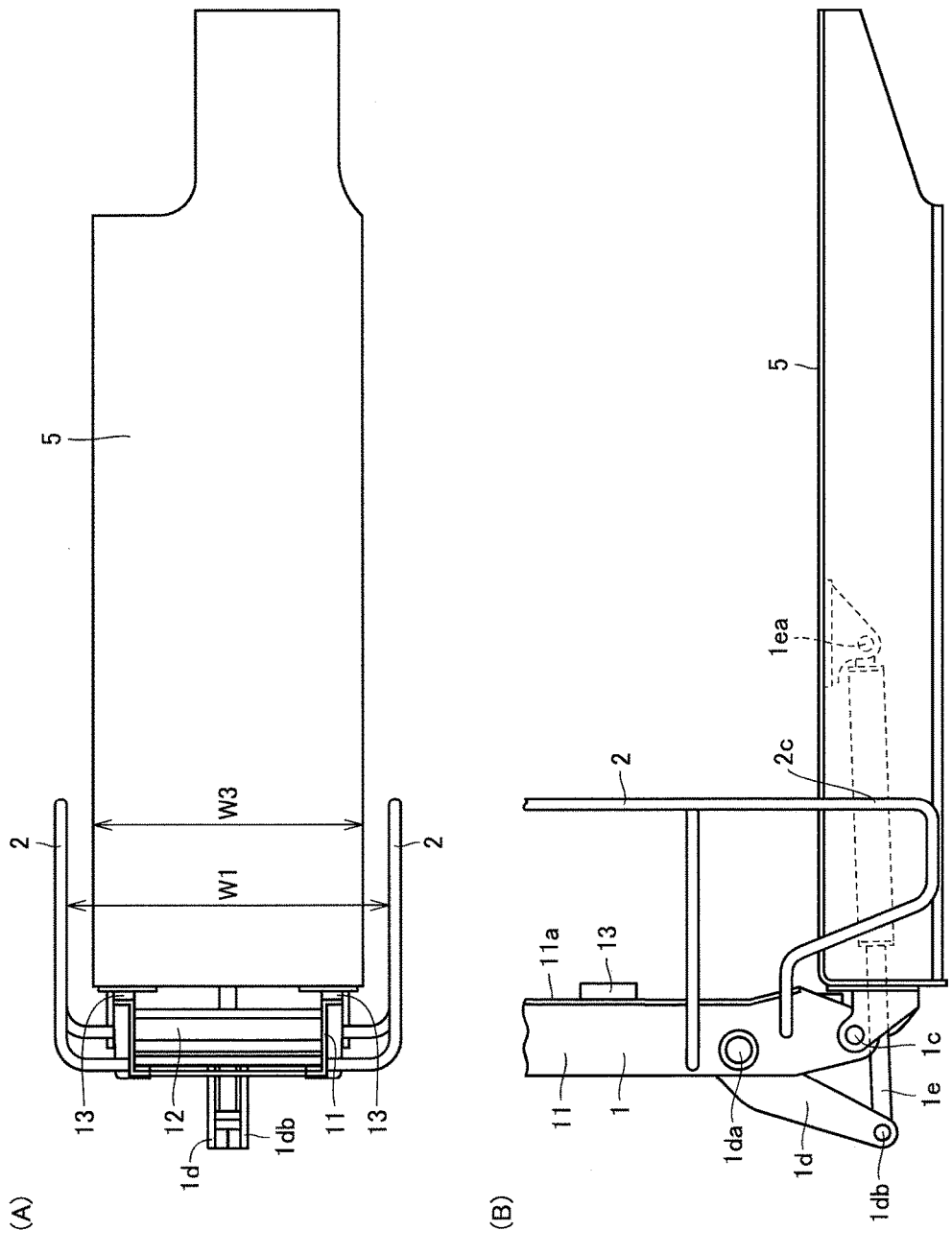
FIG. 3(A) is a plan view of a main frame and a climbing apparatus body of the access system shown in FIG. 2 in a folded posture, FIG. 3(A) being shown from above the climbing apparatus body (from above the work vehicle)
FIG. 3(B) is a side view of the main frame and the climbing apparatus body of the access system shown in FIG. 2 in the folded posture, FIG. 3(B) being shown from a side of the climbing apparatus body.

Width W1 between right and left banister portions 2 of the pair is larger than width W2 between right and left handrails 3 of the pair. As shown in FIG. 3(A), width W2 between right and left handrails 3 of the pair is larger than width W3 of main frame 5.

Stair portion 6 is disposed between paired right and left connection plates 4. Stair portion 6 is designed for climbing from the climbing apparatus body 1 side toward passage portion 7.

Passage portion 7 is disposed to be adjacent to paired right and left connection plates 4. Passage portion 7 is formed of a flat surface having asperities for preventing slipping. Passage portion 7 is disposed on the opposite side of paired right and left connection plates 4 to climbing apparatus body 1. Passage portion 7 is attached to main frame 5. For example, an upper surface of a battery case may be used as passage portion 7.

Stair portion 8 is designed for further climbing from passage portion 7 toward the operator's compartment. Stair portion 8 has banisters 9 disposed on the right and left of stair portion 8.

Next, a driving mechanism of the climbing apparatus body in the present embodiment is described with reference to FIGS. 3(A) and 3(B).

FIG. 3(A) is a plan view of the main frame and the climbing apparatus body of the access system shown in FIG. 2 in the folded posture, FIG. 3(A) being shown from above the climbing apparatus body, and FIG. 3(B) is a side view shown from a side of the climbing apparatus body.

As shown in FIGS. 3(A) and 3(B), climbing apparatus body 1 includes a projection piece 1d fixed to climbing apparatus body 1 by welding. Specifically, one end of projection piece 1d is fixed to a fixed shaft 1da by welding, the fixed shaft 1da being fixed to two side plates 11 of climbing apparatus body 1. The other end of projection piece 1d is connected to one end of hydraulic cylinder 1e with a rotational shaft 1db. The other end of hydraulic cylinder 1e is supported by main frame 5 with a rotational shaft 1ea.

Projection piece 1d is rotatable about rotational shaft 1db relative to hydraulic cylinder 1e Hydraulic cylinder 1e is rotatable about rotational shaft 1ea relative to main frame 5.

Operation of hydraulic cylinder 1e as an actuator allows climbing apparatus body 1 to rotate about rotational shaft 1c with projection piece 1d lying between hydraulic cylinder 1e and climbing apparatus body 1. This allows a rotational operation of climbing apparatus body 1 between the in-use posture and the folded posture.

Next, the in-use posture and the folded posture of climbing apparatus body 1 in the access system of the present embodiment are described with reference to FIGS. 4 and 5.

FIGS. 4 and 5 show the climbing apparatus body of the hydraulic excavator shown in FIG. 1 in the in-use posture and the folded posture, respectively, FIGS. 4 and 5 being shown from a side of the climbing apparatus body.

As shown in FIG. 4, in the in-use posture of climbing apparatus body 1, climbing apparatus body 1 is inclined so that the other end 1b is located below one end 1a. Paired right and left banister portions 2 include respective protruding portions 2c extending toward handrail 3 relative to the position of rotational shaft 1c in the direction from the other end 1b to one end 1a (the direction of an arrow A in the drawing) in the in-use posture in a side view of climbing apparatus body 1.

Specifically, in a side view of climbing apparatus body 1, respective protruding portions 2c of paired right and left banister portions 2 protrude to the handrail 3 side relative to a virtual straight line NL that is a perpendicular line of a virtual straight line SL connecting one end 1a and the other end 1b of climbing apparatus body 1 with each other and that passes through rotational shaft 1c. Virtual straight line SL is a straight line passing through the center of rotational shaft 1c in a side view of climbing apparatus body 1.

In a side view of climbing apparatus body 1, banister portions 2 overlap handrails 3 in the in-use posture.

Grasp portions 2b and the upper portions of protruding portions 2c are set to be the same in height LA from virtual straight line SL passing through the center of rotational shaft 1c. In a side view of climbing apparatus body 1, height LA of banister portions 2 from the center of rotational shaft 1c is set to be less than a distance LB in the vehicular body width direction from the center of rotational shaft 1c to rear ends 4b of connection plates 4.

In a side view of climbing apparatus body 1, a distance LC from the center of rotational shaft 1c to upper ends 2EP of protruding portions 2c on the handrail 3 side is set to be less than distance LB in the vehicular body width direction from the center of rotational shaft 1c to rear ends 4b of connection plates 4.

As shown in FIG. 5, in the folded posture of climbing apparatus body 1, climbing apparatus body 1 stands so that the other end 1b is directed upward. In the folded posture, two side plates 11 are upright vertically.

In the folded posture, shock-absorbing members 13 of climbing apparatus body 1 face front ends 4a of connection plates 4 and are in contact with front ends 4a of connection plates 4. In the folded posture, outward ends 3EP of handrails 3 protrude outward in the width direction of the work vehicle relative to side plates 11. Parts of the inclination portions of handrails 3 are located in areas between side plates 11 and vertical portions 2ab of banister portions 2.

Next, a rotational operation between the in-use posture and the folded posture of climbing apparatus body 1 in the access system of the present embodiment is described with reference to FIGS. 6 and 7.

Figure 6:
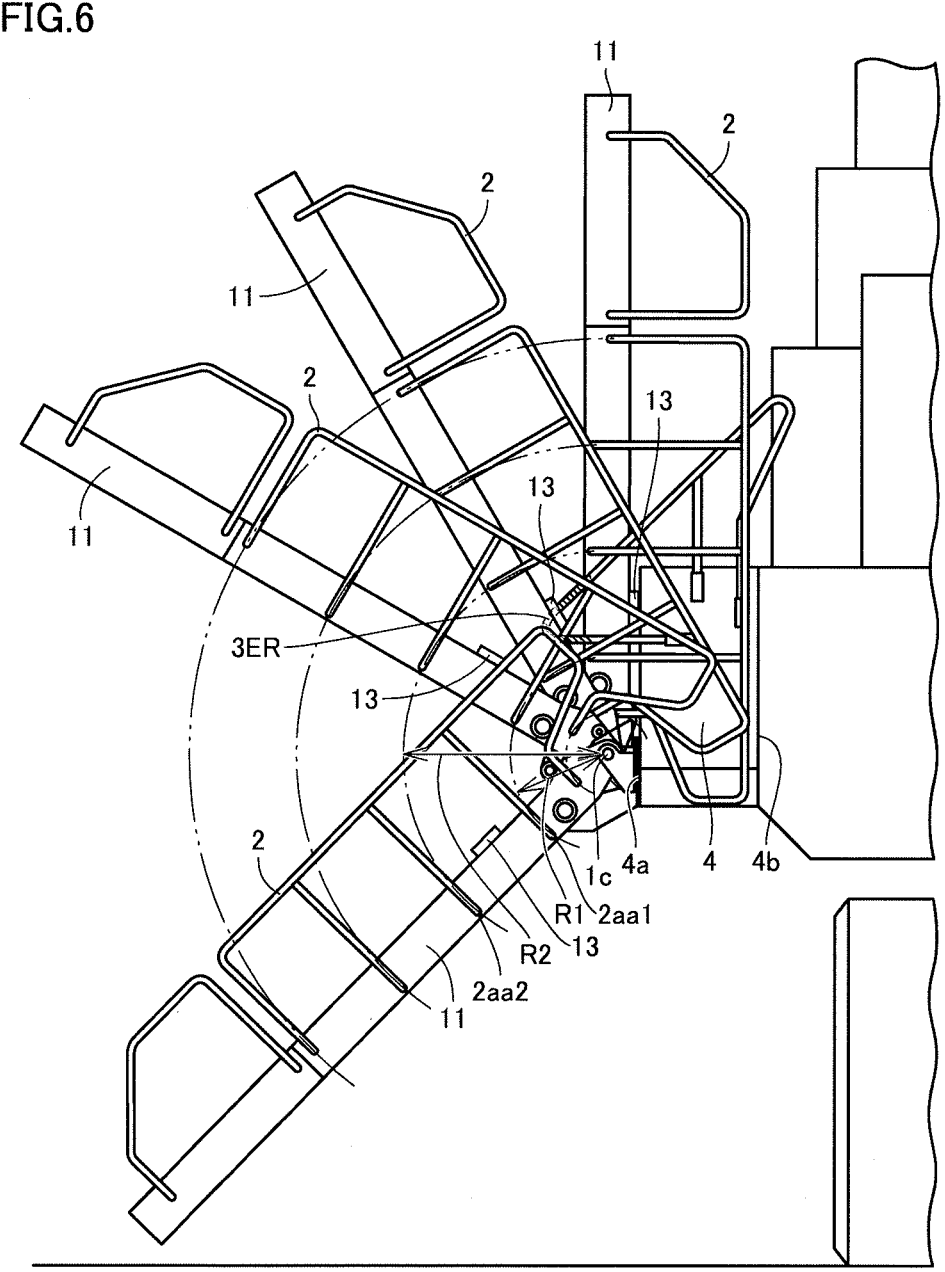
FIG. 6 shows a state where the climbing apparatus body is rotating between the in-use posture and the folded posture, FIG. 6 being shown from a side of the climbing apparatus body (from the rear of the work vehicle).

FIG. 6 shows, from a side of the climbing apparatus body, a state where the climbing apparatus body is rotating between the in-use posture and the folded posture. FIG. 7 shows, from a side of the climbing apparatus body, a mechanism for rotating the climbing apparatus body between the in-use posture and the folded posture relative to the main frame.

As shown in FIG. 6, climbing apparatus body 1 rotates about rotational shaft 1c, thereby being rotatable between the in-use posture and the folded posture. In a side view of climbing apparatus body 1, the rotational trajectories (the double-dotted chain lines in FIG. 6) of the connection portions at which banister portions 2 and climbing apparatus body 1 are connected to each other do not interfere with handrails 3 within an angular range of rotation of climbing apparatus body 1 from the in-use posture to the folded posture. This feature is described below in detail.

As shown in FIG. 5, banister portions 2 and climbing apparatus body 1 are connected to each other at a plurality of connection portions. The plurality of connection portions include a first connection portion 2aa1 and a second connection portion 2aa2. In a side view of climbing apparatus body 1, first connection portion 2aa1 and second connection portion 2aa2 are adjacent to each other with handrail 3 lying therebetween in the folded posture. Handrail 3 includes a protruding area 3ER (the hatched area in the drawing) protruding, relative to first connection portion 2aa1 and second connection portion 2aa2, in the direction of rotation (the direction of an arrow RD in the drawing) of the climbing apparatus body from the folded posture. Protruding area 3ER is an area protruding in the direction of rotation (the direction of arrow RD in the drawing) relative to a virtual straight line IL connecting first connection portion 2aa1 and second connection portion 2aa2 in a side view of climbing apparatus body 1. Protruding area 3ER is located within an area larger than radius R1 of rotation of first connection portion 2aa1 and smaller than radius R2 of rotation of second connection portion 2aa2 at a time of rotation of climbing apparatus body 1 as shown in FIG. 6. Accordingly, the rotational trajectories of the plurality of connection portions at which banister portion 2 and climbing apparatus body 1 are connected to each other do not interfere with protruding area 3ER of handrail 3 within an angular range of rotation of climbing apparatus body 1 from the in-use posture to the folded posture in a side view of climbing apparatus body 1.

Figure 7:
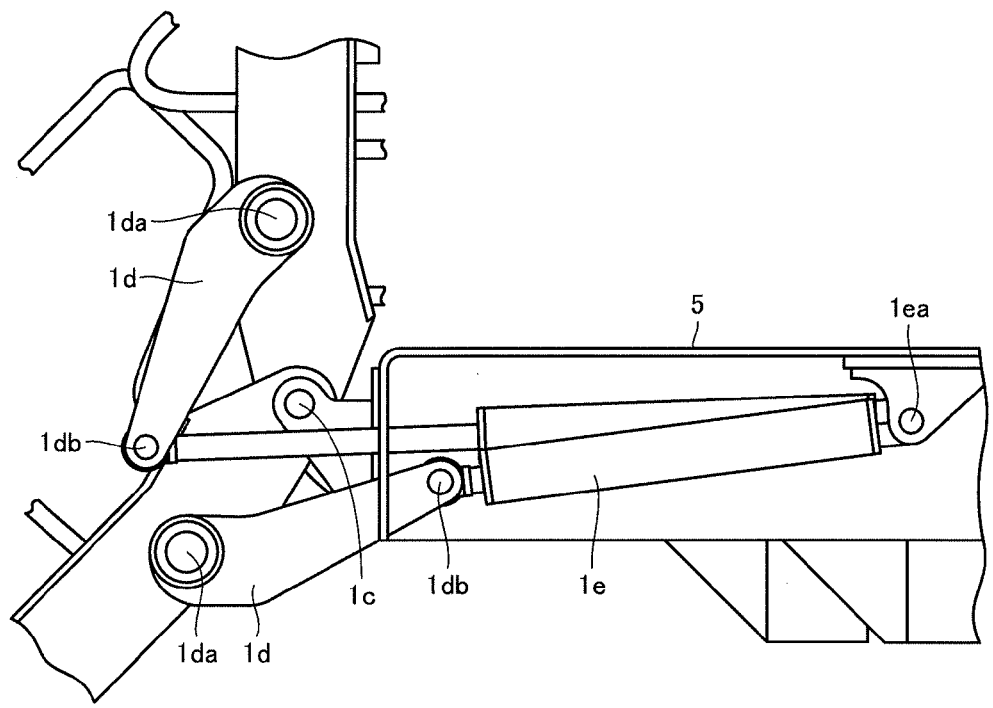
FIG. 7 shows a mechanism for rotating the climbing apparatus body between the in-use posture and the folded posture relative to the main frame, FIG. 7 being shown from a side of the climbing apparatus body (from the rear of the work vehicle).

As shown in FIG. 7, hydraulic cylinder 1*e* as an actuator gets longer and shorter at a time of the above-described rotational operation of climbing apparatus body 1. Hydraulic cylinder 1*e* getting longer and shorter causes projection piece 1*d* to rotate about rotational shaft 1*db* relative to hydraulic cylinder 1*e*. Rotation of projection piece 1*d* causes the driving force of hydraulic cylinder 1*e* to be transmitted to climbing apparatus body 1 through projection piece 1*d*. Climbing apparatus body 1 receives the driving force of hydraulic cylinder 1*e* to rotate about rotational shaft 1*c*. Climbing apparatus body 1 thus rotates between the in-use posture and the folded posture.

When climbing apparatus body 1 switches from the in-use posture to the folded posture, a piston rod of hydraulic cylinder 1*e* sticks out to make hydraulic cylinder 1*e* longer. The driving force of hydraulic cylinder 1*e* is transmitted to climbing apparatus body 1 through projection piece 1*d*. Climbing apparatus body 1 thus rotates about rotational shaft 1*c* and switches from the in-use posture to the folded posture.

When climbing apparatus body 1 switches from the folded posture to the in-use posture, on the other hand, the piston rod of hydraulic cylinder 1*e* is retracted to make hydraulic cylinder 1*e* shorter. The driving force of hydraulic cylinder 1*e* is transmitted to climbing apparatus body 1 through projection piece 1*d*. Climbing apparatus body 1 thus rotates about rotational shaft 1*c* and switches from the folded posture to the in-use posture.

Hydraulic cylinder 1*e* is designed in such a way that the piston rod reaches the stroke end on the retraction side in the in-use posture. This can prevent climbing apparatus body 1 from exceeding a predetermined inclination angle in the in-use posture.

Next, advantageous effects of the present embodiment are described with reference to drawings including FIGS. 8(A) and 8(B).

Figure 8:
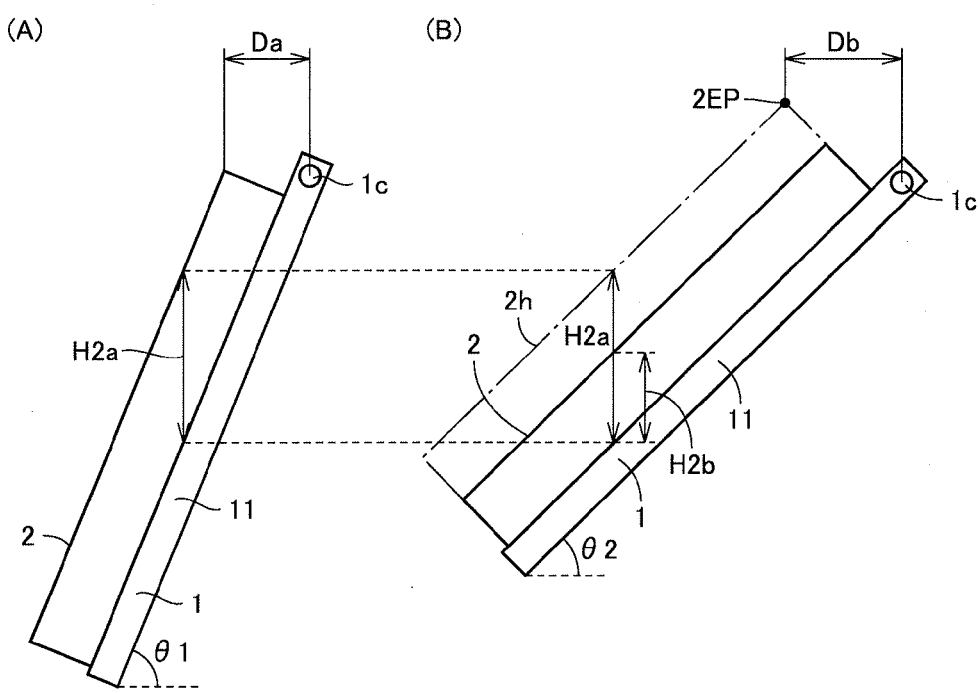
FIG. 8(A) is a schematic diagram showing a state where the climbing apparatus body in the in-use state is large in inclination angle relative to a horizontal plane.
FIG. 8(B) is a schematic diagram showing a state where the climbing apparatus body in the in-use state is small in inclination angle relative to a horizontal plane.

FIG. 8(A) is a schematic diagram showing a state where the climbing apparatus body in the in-use state is large in inclination angle relative to a horizontal plane, and FIG. 8(B) is a schematic diagram showing a state where the climbing apparatus body is small in inclination angle.

In order to enhance ease of ascent and descent for an operator, it is conceivable that inclination angle $\theta 1$ of climbing apparatus body 1 shown in FIG. 8(A) may be made smaller, like inclination angle $\theta 2$ shown in FIG. 8(B).

If inclination angle $\theta 2$ of climbing apparatus body 1 is made smaller as shown in FIG. 8(B), height H2*b* of banister portions 2 in the vertical direction is made lower than height H2*a* in FIG. 8(A). In this case, since banister portions 2 have lower height H2*b* as seen from an operator going up/down climbing apparatus body 1, an operator cannot easily grasp banister portions 2.

In view of this, it is conceivable that height H2*b* of banister portions 2 in the vertical direction may be made higher in a state of inclination angle $\theta 2$ in FIG. 8(B). For example, it is conceivable that the height of banister portions 2 in the vertical direction may be made the same as height H2*a* in FIG. 8(A), like banister portions 2*h* shown by a chain line in FIG. 8(B). If the height is made higher like banister portions 2*h*, a distance Db in the width direction of the work vehicle between upper ends 2EP of banister portions 2*h* and rotational shaft 1*c* is larger than a distance Da in FIG. 8(A).

In order to overlap handrails 3 with banister portions 2 in the state shown in FIG. 8(B), handrails 3 need to be extended to the banister portion 2*h* side. If handrails 3 are extended to the banister portion 2 side, handrails 3 will protrude significantly outward in the width direction of work vehicle 50 in the folded state shown in FIG. 5. There is thus a risk that portions of handrails 3 protruding outside the vehicle may interfere with obstacles while vehicle 50 is in action.

In contrast, according to the present embodiment, banister portions 2 include portions (protruding portions 2*c*) extending toward handrail 3 relative to the position (perpendicular line NL in the drawing) of rotational shaft 1*c* as shown in FIG. 4. This eliminates the need for extending handrails 3 outward (to the banister portion 2 side) in order to overlap banister portions 2 and handrails 3 with each other in the in-use posture in a side view, if climbing apparatus body 1 is made smaller in inclination angle $\theta$ relative to a horizontal plane and banister portions 2 need be higher in height H2 in the vertical direction. This allows the outward protrusions of handrails 3 to be small in dimension in the folded posture of climbing apparatus body 1 shown in FIG. 5 and can avoid interferences between handrails 3 and obstacles.

In a case where banister portions 2 are extended toward handrail 3 relative to the position (perpendicular line NL in the drawing) of rotational shaft 1*c* as described above, there is a risk that protruding portions 2*c* of banister portions 2 may interferer with main frame 5 when climbing apparatus body 1 is made upright in the folded posture.

In contrast, in the present embodiment, width W1 between right and left banister portions 2 of the pair is set to be larger than width W3 of main frame 5 as shown in FIG. 3(A). This can prevent paired right and left banister portions 2 from interfering with main frame 5 when climbing apparatus body 1 is made upright in the folded posture as shown in FIG. 3(B).

Further, in the present embodiment, as shown in FIG. 2, banister portions 2 are connected to side plates 11 of climbing apparatus body 1 and extend from the connection portions, at which banister portions 2 are connected to side plates 11, laterally and then upward. Accordingly, width W1 between right and left banister portions 2 of the pair can easily be made larger than width W3 of main frame 5 as shown in FIG. 3(A).

Further, as shown in FIG. 2, banister portions 2 are connected to side plates 11 of climbing apparatus body 1 and extend from the connection portions, at which banister portions 2 are connected to side plates 11, laterally and then upward. Accordingly, width W1 between right and left banister portions 2 of the pair can easily be made larger than width W2 between right and left handrails 3 of the pair.

Further, as shown in FIG. 5, shock-absorbing members 13 as stoppers can be attached to surfaces of side plates 11 which are to face front ends 4*a* of connection plates 4 in the folded posture of climbing apparatus body 1. Accordingly, shock-absorbing members 13 can relax shocks due to impacts of side plates 11 and connection plates 4 on each other when climbing apparatus body 1 is rotated from the in-use posture to the folded posture as shown in FIG. 6.

Further, in the present embodiment, as shown in FIG. 4, protruding portions 2*c* of banister portions 2 overlap handrails 3 in the in-use posture in a side view of climbing apparatus body 1. Accordingly, an operator going up/down climbing apparatus body 1 can grasp banister portions 2 and handrails 3 continuously. This can ensure ease of ascent and descent for an operator going up/down climbing apparatus body 1 and can safeguard an operator.

Further, in the present embodiment, as shown in FIG. 4, height LA of banister portions 2 from rotational shaft 1*c* is less than distance LB from rotational shaft 1*c* to rear ends 4*b* of connection plates 4. This can prevent banister portions 2 from interfering with the body of work vehicle 50 when climbing apparatus body 1 rotates between the in-use posture and the folded posture as shown in FIG. 6.

Further, as shown in FIG. 4, distance LC from rotational shaft is to upper ends 2EP of banister portions 2 is set to be less than distance LB from rotational shaft 1c to rear ends 4b of connection plates 4. This can more reliably prevent banister portions 2 from interfering with the body of work vehicle 50 when climbing apparatus body 1 rotates between the in-use posture and the folded posture as shown in FIG. 6.

Further, in the present embodiment, as shown in FIG. 6, the rotational trajectories of the connection portions at which banister portions 2 and climbing apparatus body 1 are connected to each other do not interfere with handrails 3 within an angular range of rotation of climbing apparatus body 1 from the in-use posture to the folded posture in a side view of climbing apparatus body 1. This can prevent banister portions 2 from interfering with handrails 3 within the angular range of rotation from the in-use posture to the folded posture.

In the above embodiment, an explanation has been given of a case where banister portions 2 overlap handrails 3 in the in-use posture in a side view of climbing apparatus body 1 as shown in FIG. 4. Banister portions 2, however, do not have to overlap handrails 3 in the in-use posture in a side view of climbing apparatus body 1. In this case, gaps may be provided between handrails 3 and upper ends 2EP of protruding portions 2c of banister portions 2 on the handrail 3 side in a side view of climbing apparatus body 1.

Further, climbing apparatus body 1 only needs to be rotatably supported by the support member including main frame 5 and connection plates 4. Further, the support member may include components other than main frame 5 and connection plates 4, and handrails 3 may be supported by components other than main frame 5 and connection plates 4. In a case where access system 1 is applied to a work vehicle, the support member may be any part of the body of the work vehicle and handrails 3 may be supported by any part of the body of the work vehicle.

It should be understood that the embodiment disclosed herein is illustrative in every respect, not limitative. It is intended that the scope of the present invention is defined not based on the above description but based on the scope of the claims and includes any modification within the meaning and scope equivalent to the scope of the claims.

REFERENCE SIGNS LIST

1: climbing apparatus body; 1a: one end; 1b: the other end; 1c, 1db, 1ea: rotational shaft; 1d: projection piece; 1da: fixed shaft; 1e: hydraulic cylinder; 2, 2h, 9: banister portion; 2EP: upper end; 2a: support portion; 2aa: horizontal portion; 2aa1, 2aa2: connection portion; 2ab: vertical portion; 2b: grasp portion; 2c: protruding portion; 3: handrail; 3EP: outward end; 3ER: protruding area; 4: connection plate; 4a: front end; 4b: rear end; 5: main frame; 6, 8: stair portion; 7: passage portion; 9: banister; 10: access system; 11: side plate; 12: step; 13: shock-absorbing member; 20: travelling unit; 21: crawler belt apparatus; 30: revolving unit; 31: operator's compartment; 32: engine compartment; 33: counterweight; 40: work implement; 41: boom; 42: arm; 43: bucket; 50: work vehicle.

The invention claimed is:

1. An access system comprising:
a support member including a main frame;
a climbing apparatus body including a first end and a second end and supported by the support member rotatably about a rotational shaft at the first end, the climbing apparatus body being capable of taking an in-use posture in which the climbing apparatus body is inclined so that the second end is located below the first end and a folded posture in which the climbing apparatus body stands so that the second end is directed upward;
a handrail supported by the support member; and
a banister attached to the climbing apparatus body, the banister including a portion extending toward the handrail past a position of the rotational shaft in a direction from the second end to the first end in the in-use posture in a side view of the climbing apparatus body.

2. The access system according to claim 1, wherein
the banister includes a pair of right and left banister portions, and
a width between the right and left banister portions of the pair is larger than a width of the main frame.

3. The access system according to claim 1, wherein, in the in-use posture, the banister is connected to a side portion of the climbing apparatus body and extends from the side portion laterally and then upward.

4. The access system according to claim 1, wherein, in a side view of the climbing apparatus body, the banister overlaps the handrail in the in-use posture.

5. The access system according to claim 1, wherein
the support member includes a connection plate,
the connection plate is disposed between the handrail and the main frame, the connection plate having a front end located on a side adjacent to the rotational shaft and a rear end located on a side opposite to the front end, and
a height of the banister from the rotational shaft is less than a distance from the rotational shaft to the rear end of the connection plate.

6. The access system according to claim 1, wherein
the banister and the climbing apparatus body are connected to each other at least at a first connection portion and a second connection portion, and
in a side view of the climbing apparatus body in the folded posture, the first connection portion and the second connection portion are adjacent to each other with the handrail lying between the first connection portion and the second connection portion, and the handrail includes a protruding area that protrudes, relative to the first connection portion and the second connection portion, in a direction of rotation of the climbing apparatus body from the folded posture, the protruding area being located within an area larger than a radius of rotation of the first connection portion and smaller than a radius of rotation of the second connection portion at a time of rotation of the climbing apparatus body.

7. A work vehicle comprising a body including the access system according to claim 1.

* * * * *